(12) United States Patent
Quave, Jr.

(10) Patent No.: US 10,371,114 B2
(45) Date of Patent: Aug. 6, 2019

(54) OVERRUNNING CLUTCH FOR AN ENGINE STARTER ADAPTER

(71) Applicant: Hartzell Engine Technologies, LLC, Montgomery, AL (US)

(72) Inventor: Richard F. Quave, Jr., Montgomery, AL (US)

(73) Assignee: Hartzell Engine Technologies, Montgomery, AL (US)

( * ) Notice: Subject to any disclaimer, the term of this patent is extended or adjusted under 35 U.S.C. 154(b) by 114 days.

(21) Appl. No.: 15/713,898

(22) Filed: Sep. 25, 2017

(65) Prior Publication Data

US 2019/0093620 A1 Mar. 28, 2019

(51) Int. Cl.
*F02N 15/02* (2006.01)
*F16D 41/04* (2006.01)
(52) U.S. Cl.
CPC ........... *F02N 15/023* (2013.01); *F16D 41/04* (2013.01); *F02N 2250/04* (2013.01)
(58) Field of Classification Search
CPC ..... F02N 15/023; F02N 2250/04; F16D 41/04
USPC ........................................ 123/179.25, 185.11
See application file for complete search history.

(56) References Cited

U.S. PATENT DOCUMENTS

| 6,438,962 | B1 | 8/2002 | Blain et al. |
| 8,166,945 | B2 | 5/2012 | Spicer et al. |
| 9,169,904 | B2 | 10/2015 | Graves et al. |
| 2013/0327182 | A1* | 12/2013 | Palfai ...................... F02N 11/10 74/7 C |
| 2015/0047594 | A1* | 2/2015 | Ikemori .................. F02N 15/00 123/179.25 |
| 2016/0097328 | A1 | 4/2016 | Wintgens et al. |
| 2017/0058852 | A1 | 3/2017 | Takagi et al. |

OTHER PUBLICATIONS

Continental Motors, Inc Aircraft Engine, Service Bulletin—Oct. 19, 2016 "Engine Damage Due to Kickback" Continental Motors, Inc. Customer Services, 2039 South Broad Street, Mobile, AL 36615.
Federal Aviation Administration Aviation Safety—Special Airworthiness Information Bulletin (SAIB: NE-17-11) May 10, 2017 "Powerplant—Engine damage as a result of kickback" Atlanta Aircraft Certification Office, 1701 Columbia Ave., College Park, GA 30337.

* cited by examiner

*Primary Examiner* — Hai H Huynh
(74) *Attorney, Agent, or Firm* — Bradley Arant Boult Cummings; Phillip E. Walker (57) ABSTRACT

A device for operatively connecting an engine starter to an engine where the engine includes an engine crankshaft and the engine starter has a starter shaft with a length and a worm, or worm screw, of a worm drive spaced radially from the starter adapter shaft and within the length of the shaft is described herein. The device compromises a worm gear assembly as operatively attached to the starter adapter shaft. The a worm gear assembly includes a worm gear, or worm wheel, positioned to engage the worm and an overrunning clutch positioned radially between the worm gear and the starter adapter shaft and operatively engaging the starter adapter shaft.

21 Claims, 6 Drawing Sheets

FIG. 1

Prior Art

FIG. 2

Prior Art

OVERRUNNING CLUTCH FOR AN ENGINE STARTER ADAPTER

This non-provisional patent application is filed by applicant Hartzell Engine Technologies LLC for the inventor Richard F. Quave, Jr, a citizen of the United States, residing at Montgomery, Ala., for the invention of an "Overrunning Clutch for an Engine Starter Adapter."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

All patents and publications described or discussed herein are hereby incorporated by reference in their entirety.

BACKGROUND

Technical Field

The current disclosure relates to a device, a system and a method for transferring torque within a mechanical system, and more specifically with transferring starting torque from an engine starter to an engine.

Background of the Disclosure

Combustion engines have always required a starting force to begin the combustion process within the engine. Conventional internal combustion engines are typically started by a dedicated starter motor mounted to the engine. This starter motor is typically electrical in nature and is typically connected to the crankshaft of the engine. When the starter receives the signal, it begins to turn the crankshaft while ignition begins within the internal combustion engine. This concept is basically the same in engines whether used on land, sea or in the air.

The starting motors, which are typically electric motors, are mounted on and cranking torque coupled to the engine through various means. One method includes a starter adapter that both mounts the starter to the engine and couples the starting motor torque to the engine crankshaft to facilitate cranking the engine. Generally, the starter adapter provides three functions: (1) mounting/attachment of the starter to or near the engine, (2) transmission of the starter motor torque to the engine crankshaft during engine cranking events, and (3) de-coupling of the starter motor from the starter adapter driveshaft during normal engine operation, e.g., running of the engine. Alternate starter versions can provide auxiliary functions such as a provision for a power take off (PTO) or a drive location for other accessories, e.g., scavenge pumps, vacuum pumps, etc.

The starter motor, and additionally the starter adapter drive, can be susceptible to normal wear and tear during engine starting and operation. Typically, the speed of an engine and its crankshaft and gears are much higher than the speed capability of the actual starter motor. As such, during normal operation of the engine, if the starter was not effectively decoupled from the crankshaft, the starter motor itself would be damaged. This decoupling usually occurs in the starter adapter drive. Additionally, there is a combustion engine phenomenon called "kickback" wherein the fuel and charged air mixture within the engine combust before the pistons reach top dead center of the piston stroke. When this occurs, the crankshaft is violently forced to rotate in a reverse direction resulting in extreme loads on the engine components. These loads are transferred to other items attached or coupled to the crankshaft, such as the starter adapter shaft and potentially the engine starter itself.

Figure 1:
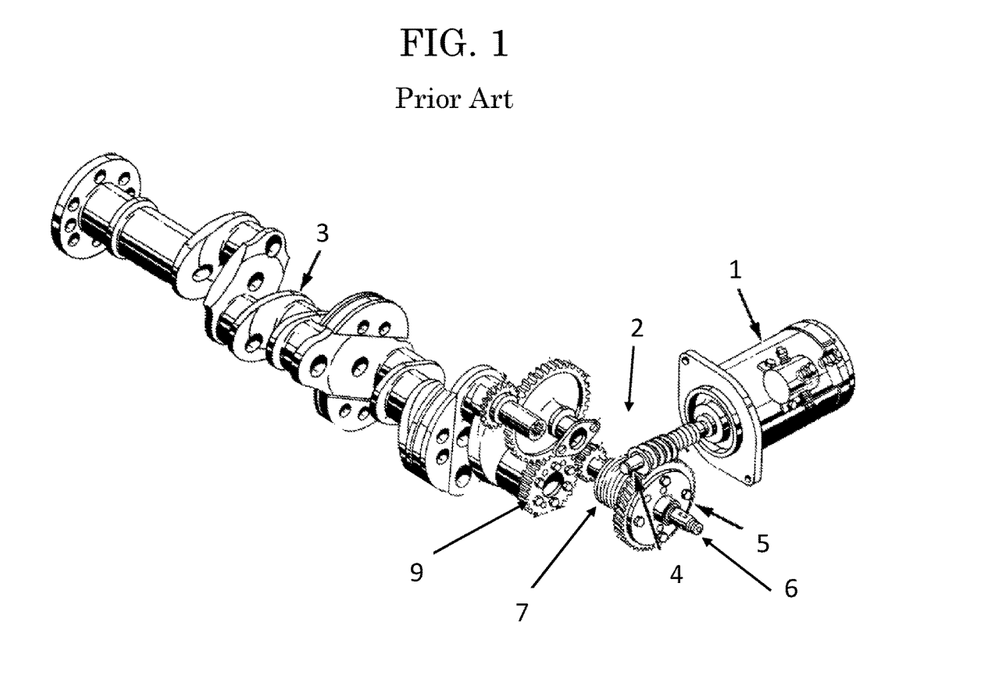
FIG. 1 is an example of prior art gear train assembly from an engine starter to the crankshaft of an engine.

Currently in the conventional engine arts, especially in the aviation engines, a starter is coupled to a starter adapter driveshaft which is then coupled to the engine crankshaft. In an attempt to avoid damage from both kickbacks and engine speeds that would exceed the starter speeds, conventional starting systems use a wrap spring-type clutch, as depicted generally in FIGS. 1 and 2. FIG. 1 shows a general starter 1 using an adapter 2 to connect to a crankshaft 3. The adapter includes a worm 4 and connects with a worm gear 5 that is used to transmit the torque from the starter 1 to the starter adapter shaft 6. This conventional adapter 2 uses a wrap spring 7 along with a drum 8 on the starter adapter shaft 6.

Figure 2:
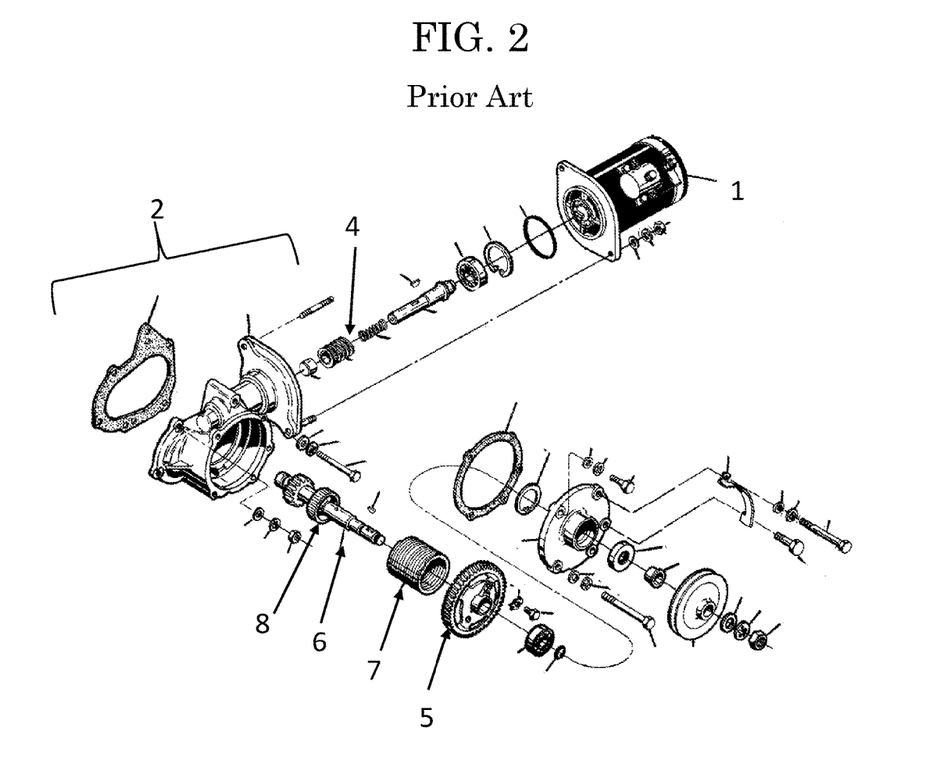
FIG. 2 is an exploded view of the starter and starter adapter as shown in FIG. 1 and including a casing and assembly items.

In this conventional system, when the starter 1 is energized, torque is transmitted through the starter adapter worm 4 to the starter adapter worm gear 5. As the worm gear 5 rotates, the wrap spring 7 is progressively tightened against the cylindrical drum 8 on the starter adapter shaft 6. When the wrap spring 7 is sufficiently tight, it engages or "bites" the drum 8 thereby allowing torque to be coupled or transferred to the engine crank gear 9 and ultimately the crankshaft 3, thereby enabling engine cranking. The wrap spring 7 attempts to decouple the starter adapter shaft 6 during operation of the engine through "wrap spring relaxation." This, in theory, permits sliding between the drum 8 and the internal diameter of the wrap spring 7.

This relaxed condition is supposed to be sustained throughout normal engine operation, or running of the engine. However, due to the nature of this conventional starter system, the conventional starter systems fail at a higher propensity than they should and are a poor deterrent to the kickback phenomenon previously mentioned. For example, the principle failure mode is erosion of the outer surface of the drum 8 and the internal surface of the wrap spring 7. As these features wear, the torque transmission capability of the starter adapter 2 is diminished, eventually to the point where the combination of the wrap spring 7 and drum 8 can no longer transmit sufficient torque for engine cranking. For example, the normal expected service life of a starter adapter with this wrap spring design is based upon the time between overhauls (TBO) rating on the engine. This TBO rating is approximately 2,000 hours. However, these wrap spring starter adapter designs often fail at service times below TBO ratings.

Additionally, these wrap spring-type clutches are also susceptible to damage from the kickback phenomena. The wrap spring 7 increases its connection and force on the drum 8 during the kickback phenomenon. This forces the starter motor to effectively act as a brake to the force of the kickback. This transmits a large amount of torque back to the starter 1, which is capable of causing damage. There have been reports that the kickback can damage these types of starters and, in some cases, has allowed the introduction of debris into the actual engine resulting in extensive engine damage as well as starter damage.

Over the years, there have been attempts to make updates to the starter adapter design to address the service life and the kickback issue. These attempts have been unsuccessful due to the nature of the wrap spring-type clutch and its inability to properly be decoupled in a constant overrunning mode of operation due to the intimate contact as required between the wrap spring 7 and the drum 8.

What is needed, then, is a new system and method of engine starting to allow for overrunning and reduce the risk of damage due to kickback effect. Preferably this new system includes a starter adapter that provides for proper decoupling during operation of the engine to protect the starter from speeds of the engine and to protect the starter and starter adapter from the kickback phenomenon. This type of starter and adapter are lacking in the art.

BRIEF SUMMARY

The present disclosure relates generally to internal combustion engines, and more particularly to starters and the interface of the starter motor to the internal combustion engine. For example, disclosed is a device for operatively connecting an engine starter to an engine where the engine includes an engine crankshaft and the engine starter has a starter shaft with a length and a worm, or worm screw, of a worm drive spaced radially from the starter adapter shaft and within the length of the shaft. The device compromises a worm gear assembly as operatively attached to the starter adapter shaft. The worm gear assembly includes a worm gear, or worm wheel, positioned to engage the worm and an overrunning clutch positioned radially between the worm gear and the starter adapter shaft and operatively engaging the starter adapter shaft.

In some embodiments, the worm gear assembly of the device can further include a housing positioned along the length of the starter adapter shaft. Additionally, the housing can be positioned in an approximate radial alignment with the worm. The housing can include an external housing surface and an internal housing surface wherein the internal housing surface forms a central cavity containing the overrunning clutch. The housing can further include first and second housing ends with a first bearing position proximate the first housing end and a second bearing position proximate the second housing end. The first and second bearings can be positioned within the housing with the housing supported on the starter adapter shaft by the bearings. The housing can further include a race having an external race surface and an internal race surface. The external race surface can engage the internal housing surface while the internal race surface can engage the overrunning clutch.

The device can further include at least one liner disk and at least one friction disk. The at least one liner disk and the at least one friction disk are operatively positioned between the worm gear and the housing and have a spatial relationship along the length of the starter adapter shaft.

The device can further include a biasing member operatively engaging the worm gear and the external housing surface. The external housing surface of the housing further can include a fastening area. A fastening member can be operatively engaged to the fastening area and the biasing member. The fastening member can be positioned to selectively position the biasing member in relationship to the housing and the worm gear. The selective positioning of the biasing member can adjust the spatial relationship of the at least one liner disk to the at least one friction disk. The housing can further include a first retaining member positioned proximate to the first housing end and a second retaining member positioned proximate to the second housing end.

The worm gear assembly can be positioned to transfer torque from the engine starter to the starter adapter shaft for further transfer of that torque to the engine crankshaft. Additionally, the overrunning clutch can be selected from the group consisting of a sprag clutch, a roller clutch, a ratchet clutch, a ramp clutch, a slipper clutch, and a wedge ramp clutch.

It is therefore a general object of the current disclosure to provide a device, system, and method for transferring torque from an engine starter to an engine.

Another object of the current disclosure is to provide a device that operatively connects an engine starter to a crankshaft of an engine.

Still another object of the current disclosure is to provide a device that can selectively decouple an engine starter from the crankshaft of an engine.

Another object of the current disclosure is to provide a device that protects an engine starter during operation of the engine.

Still another object of the current disclosure is to provide a device that protects an engine starter from forces that could be received from an engine.

Yet another object of the current disclosure is to provide a device that protects an engine starter and engine components from "kickbacks" from an engine.

Yet another object of the current disclosure is to provide a starter adapter device that connects an engine starter to an engine starter adapter shaft and can selectively decouple the engine starter to that engine starter adapter shaft.

Other and further objects, features, and advantageous of the present disclosure will be readily apparent to those skilled in the art upon reading of the following disclosure when taken in conjunction with accompanying drawings.

DETAILED DESCRIPTION

Referring now to FIGS. 1-6, a device and system made in accordance with the current disclosure is shown. In this disclosure, positional terms such as a "upper," "lower," "side," "top," "bottom," "vertical," "horizontal," etc. refer to the apparatus when in the orientation shown in the drawing. The skilled artisan will recognize that objects in accordance with the present disclosure can assume different orientations when in use.

Figure 3:
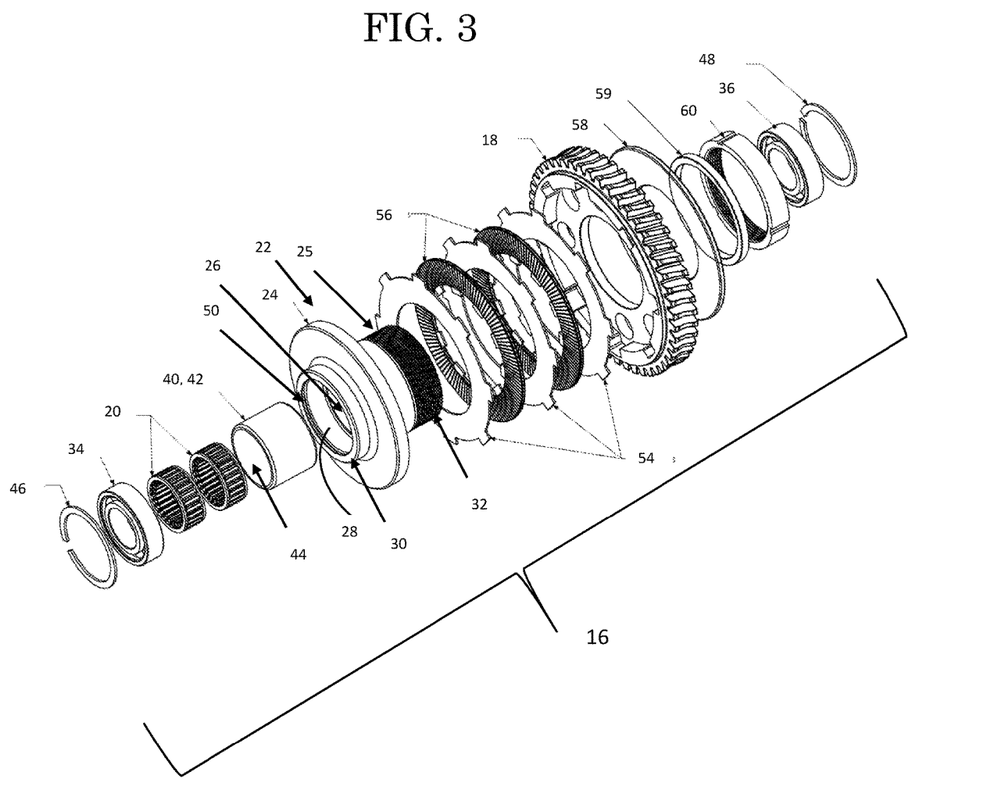
FIG. 3 is an exploded view of a device made in accordance with the current disclosure including a worm gear assembly.
Figure 4:
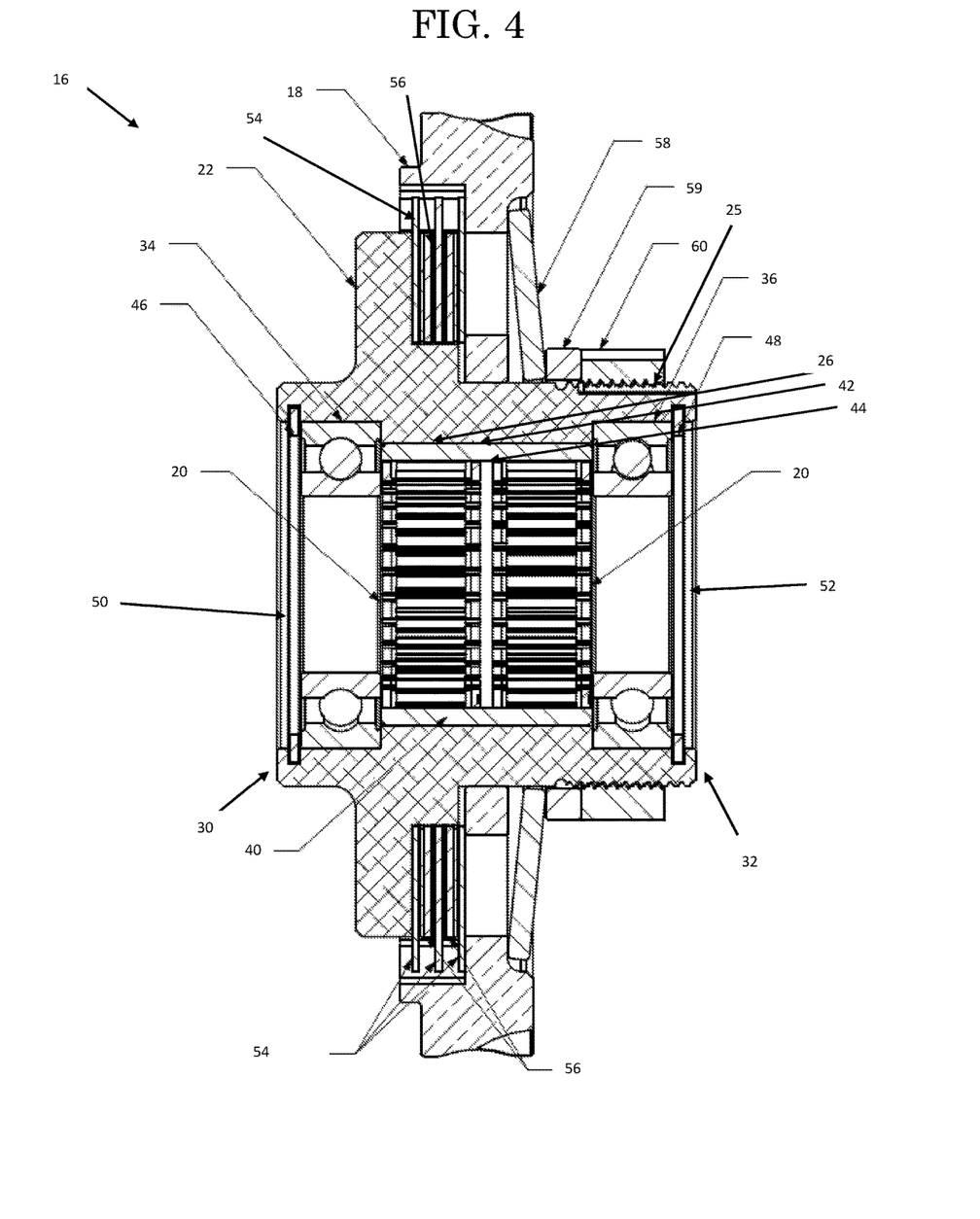
FIG. 4 is a cross-sectional view of the device assembled in FIG. 3.
Figure 5:
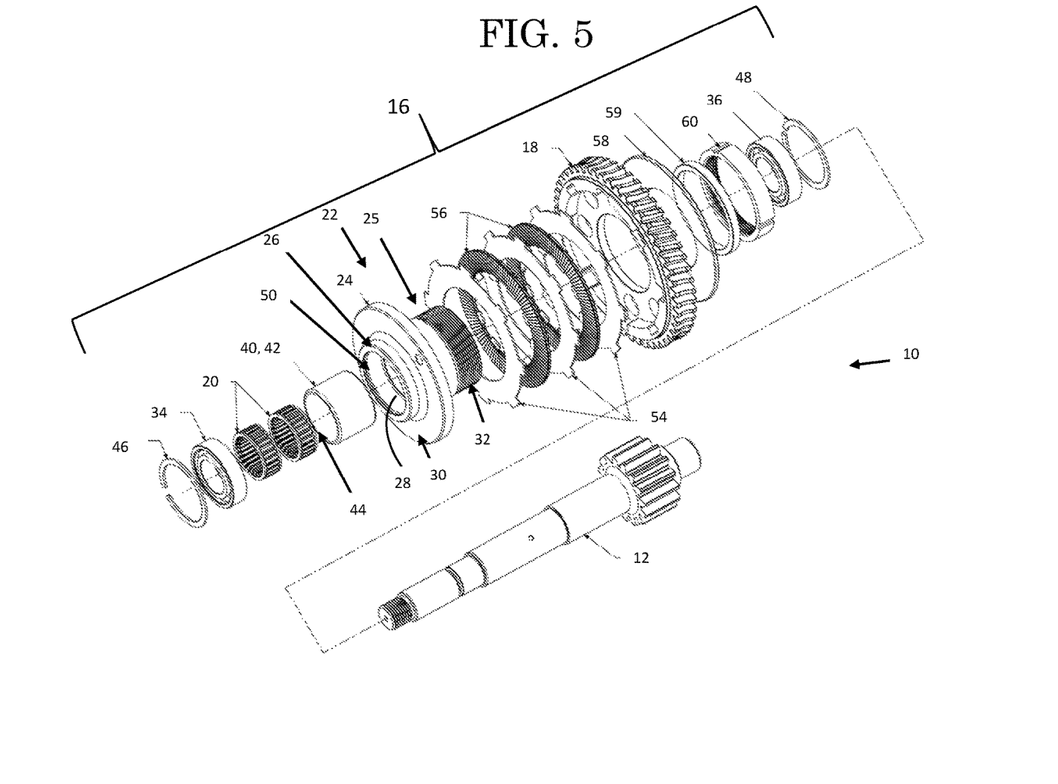
FIG. 5 is an assembly view of a device made in accordance with the current disclosure showing the starter shaft adapter.
Figure 6:
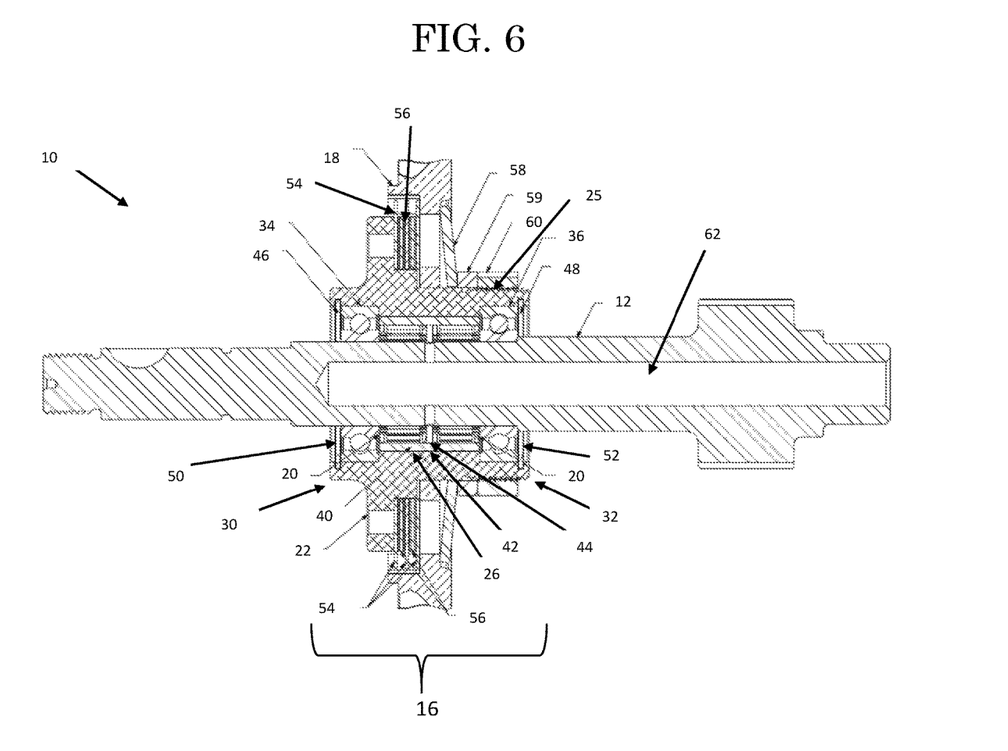
FIG. 6 is a cross-sectional view of the assembly shown in FIG. 5.
Figure 7:
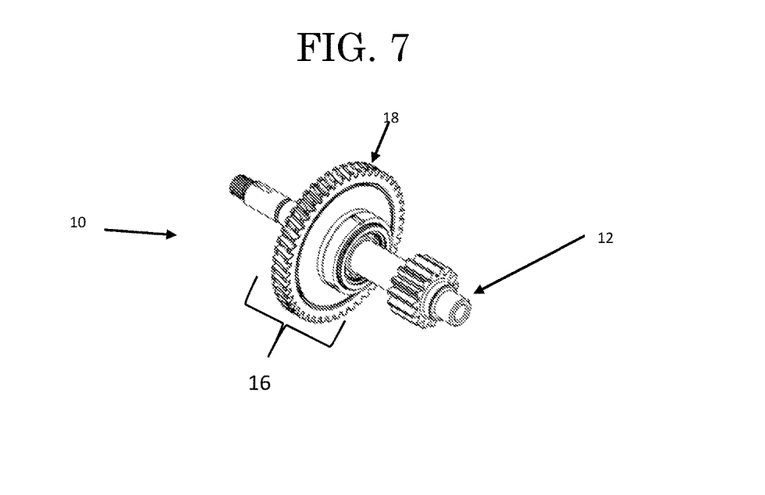
FIG. 7 is a perspective of a device made in accordance with the current disclosure.

Referring now generally to FIG. 3, the device for operatively connecting an engine starter 1 to an engine is shown and generally designated by the numeral 10. The device 10 can also be described as an engine starter adapter 10. The engine (not shown in FIG. 3) has a crankshaft 3, as shown in FIG. 1, while the engine starter can be similar to the engine starter 1 as shown in FIGS. 1 and 2. The engine starter 1 can have a starter adapter shaft 12 having a starter shaft length 14 in a worm similar to the worm 4 shown in FIGS. 1 and 2. The worm 4 is preferably spaced radially outward from the starter shaft adapter 12 and within the length of the starter adapter shaft length 14.

The device 10 includes a worm gear assembly 16 that is operatively attached to the starter adapter shaft 12. The worm gear assembly 16 includes a worm gear 18 positioned to engage the worm 4. Also included is an overrunning clutch 20 positioned radially between the worm gear 18 and the starter adapter shaft 12 and positioned to operatively engage the starter adapter shaft 12. The overrunning clutch 20 can be described as being positioned within the worm gear assembly 16, or alternatively described as being positioned within the worm gear 18. This overrunning clutch 20 can be described as an internally positioned overrunning clutch 20 where the internal positioning is within the worm gear 18.

In a preferred embodiment, the overrunning clutch 20 can be selected from the clutch group consisting of a sprag clutch, a roller clutch, a ratchet clutch, a ramp clutch, a slipper clutch, and a wedge ramp clutch.

The worm gear assembly 16 can further include a housing 22 positioned along the length of the starter adapter shaft 12. This positioning can also be described as being approximately radially aligned with the worm 4. The housing 22 can include an external housing surface 24 and an internal housing surface 26. The internal housing surface can form a central cavity 28 that contains the overrunning clutch 20.

The housing 22 can also include first housing end 30 and second housing end 32, where a first bearing 34 is positioned proximate the first housing end 30 and a second bearing 36 is positioned proximate the second housing end 32. The first and second bearings 34 and 36 are positioned within the housing 22 and the housing 22 is supported on the starter adapter shaft 12 by the first and second bearings 34 and 36.

The housing 22 can further include a race 40, which can also be described as a race ring. The race 40 includes an external race surface 42 and an internal race surface 44. The external race surface 42 can engage the internal housing surface 26 while the internal race surface 44 can engage the overrunning clutch 20. Alternatively described, the race 40 can be interference fit into the housing 22 such that there is a frictional engagement between the external surface 42 of the race 40 and the internal surface 26 of housing 22. Likewise, the internal race surface 44 can be interference fit with the overrunning clutch 20 such that there is a frictional engagement between the internal race surface 44 of the race 40 and the overrunning clutch 20.

The housing 22 can further include a first retaining member 46 and a second retaining member 48. The first retaining member 46 can be positioned proximate the first housing end 30 while the second retaining member 48 can be positioned proximate the second housing end 32. The first and second retaining members 46 and 48 can engage retaining areas 50 and 52 in the housing 22. The retaining members and the retaining areas can secure elements within the housing 22, such as the overrunning clutch 20, and the first and second bearings 34 and 36.

The device can further include at least one liner disk 54 and at least one friction disk 56. The liner disk 54 can be mechanically coupled to the worm gear 18, while the friction disk 56 can be mechanically coupled to the housing 22. In an embodiment, there are a plurality of liner disks 54 and a plurality of friction disks 56. In another embodiment, there are two friction disks 56 and three liner disks 54. The liner disks 54 and the friction disks 56 are operatively positioned between the worm gear 18 and the housing 22 and help facilitate the positioning of the worm gear 18 with respect to the housing 22. The liner disks 54 and friction disks 56 also further facilitate the torque transfer between the starter 1 and the starter adapter shaft 12, and ultimately the transfer of torque to the crankshaft 3. The liner disk 54 and friction disk 56, regardless of the number present, can be described as having a spatial relationship along the length 14 of the starter adapter shaft 12. Alternatively described, the proximity of the friction disk 56 and liner disk 54, as well as the materials from which they are composed, further facilitate the torque transfer between the starter 1 and starter adapter shaft 12. The tighter the spatial relationship between the liner disk 54 and the friction disk 56 the more torque that will be transferred between the starter 1 and starter shaft 12 before a slippage of the liner disk 54 in relation to the friction disk 56 occur. When there is slippage of the liner disk 54 in relation to the friction disk 56, the torque will not transfer, which can be described as the slip-torque threshold.

Also included is a biasing member 58 that is operatively engaging the worm gear 18 and the external housing surface 24 of the housing 22. In this embodiment, the external housing surface 24 includes a fastening area 25 and a fastening member 60 operatively engages the fastening area 25 and the biasing member 58. The biasing member 58 can be those known in the art, e.g. a spring. The fastening member 60 and fastening area 25 can be those mating and fastening devices known in the art, e.g. threads and a nut. In operation the fastening member 60 is positioned to selectively position the biasing member 58. This positioning can be described as selectively positioning the biasing member 58 in relation to the housing 22 and the worm gear 18. This selective positioning of the biasing member 58 by the fastening member 60 can also adjust the spatial relationship of the linear disk 54 and the friction disk 56 to further control the slip-torque threshold and the amount of torque transferred between the starter 1 to the starter adapter shaft 12. A spacer 59 can be included to further facilitate this interaction.

The inventive device 10 with the worm assembly 16 has advantages over the conventional art in that the positioning of the overrunning clutch 20 allows for an overrunning operation, e.g., the natural operation of the engine and its turning speeds being larger than the turning speed capacity of the starter 1. As such the overrunning clutch 20, can protect the device 10, and any attached starter 1, from the primary cause of failure in the conventional starter 1 and adapter 2 designs. Additionally, the use of the liner disk 54, friction disk 56 and biasing member 58 incorporates a torque-limiting mechanism, or torque-limiting feature, that can further protect the starter adapter device 10, and potentially any engine it is connected thereto, from damage caused by "kickback" events. The current device 10 and, more specifically, the worm gear assembly 16 is preferably designed to integrate with conventional starter 1 and crankshaft 3 as known in the art.

In operation, the inventive device 10 has its components positioned to transfer torque from the engine starter 1 to the starter adapter shaft 12 for further transfer of that torque to the engine crankshaft 3 for the starting of the engine. The torque from the starter motor 1 is transferred through the conventional worm 4 to the worm gear 18 of the worm gear assembly 16. The worm gear 18 is frictionally coupled to the housing 22, which can also be described as a hub 22, by the liner disk 54 and friction disk 56, which in combination can be described as a friction disk stack. This friction disk stack is preferably composed of alternating liner disks 54 and friction disks 56 as shown in FIGS. 3-6.

The fastening member 60, such as a threaded nut, operates with the fastening area 25, such as external threads, on the external housing surface 24 to apply a compression force to the biasing member 58, such as a spring. This biasing member 58 compresses the liner disk 54 and friction disk 56 to apply a preloaded force to the biasing member 58 allowing the presetting of the slip-torque threshold.

The race 40 can fit into the central cavity 28 of the housing 22 and the race 40 itself can contain the overrunning clutch 20. The clutch 20 can engage the starter adapter shaft 12 which can be coupled to the crankshaft 3 by conventional means, such as a pinion gear mesh.

The bearings 34 and 36 support the worm gear assembly 16 on the starter adapter shaft 12 while retaining members 46 and 48 retain the bearings 34 and 36, and overrunning clutch 20 within the central cavity 28. The overrunning clutch 20, which can be described as including clutch inserts, and the bearings 34 and 36 can be lubricated by engine-supplied pressurized oil that can be transmitted through a conducting path 62 through the center of the starter adapter shaft 12.

The overrunning clutch 20 also facilitates the decoupling of the starter 1 from the starter adapter shaft 12 during normal engine operation. During this overrunning, or operation of the engine, the starter adapter shaft 12 will be operatively engaged to the crankshaft 3 and will be rotating at the speeds of the crankshaft 3. However, the overrunning clutch 20 allows a decoupling and rotation of the starter adapter shaft 12 independent of the worm gear assembly 16. The bearings 34 and 36 allow the starter adapter shaft 12 to rotate while the remainder worm gear assembly 16 stays in a free float and non-rotating state with respect to the adapter shaft 12.

The inventive device 10 can also provide a torque-limiting function. This is accomplished again through the friction disk 56 and liner disk 54. The fastening member 60 and biasing member 58 allow a preload force to be set between the liner disk 54 and 56, and ultimately between the worm gear 18 and housing 22. This preloaded force, along with the surface characteristics of the faces of the liner disk 54 and friction 56, establishes the amount of torque that can be coupled between the liner disk 54 and friction disk 56 without slippage. This amount of force is also ultimately approximately the same force that can be coupled between the worm gear 18 and the housing 22. This slip torque level can be set to allow sufficient torque to be transferred from the starter 1 through the device 10 and to the starter adapter shaft 12 and ultimately the crankshaft 3 for engine cranking. This preset level will have the opposite effect when the torque levels exceed the slip torque level and not transmit forces between the worm gear 18 and housing 22. As such, any force from the crankshaft 3 that exceeds the slip torque level will not be transferred from the crankshaft 3 to the starter 1. Ultimately, during the slip phase, the friction disk 56 faces slide over, or rotate, with respect to the liner disk 54 faces. As the friction disks 56 are mechanically coupled to the housing 22 and the liner disks 54 are mechanically coupled to the worm gear 18, the housing 22 and worm gear 18 are allowed to move rotationally independent of one another. In this mode of operation, the two surfaces can be described as acting as a bearing system.

Thus, it is seen that the apparatus and methods disclosed herein achieve the ends and advantages previously mentioned. Numerous changes in the arrangement and construction of the parts and steps will be readily apparent to those skilled in the art, and are encompassed within the scope and spirit of the present disclosure. Further, the particular embodiments previously described are not intended to be construed as limitations upon the scope of this disclosure.

What is claimed is:

1. A device for operatively connecting an engine starter to an engine, the engine having an engine crank shaft, the engine starter having a starter shaft having a starter shaft length and a worm spaced radially from the starter adapter shaft and within the length, the device comprising:
   a worm gear assembly, the worm gear assembly operatively attached to the starter adapter shaft and including:
      a worm gear positioned to engage the worm; and
      an overrunning clutch positioned radially between the worm gear and the starter adapter shaft and operatively engaging the starter adapter shaft.

2. The device of claim 1, wherein the worm gear assembly further includes a housing positioned along the length of the starter adapter shaft and approximately radially aligned with the worm, the housing having an external housing surface and an internal housing surface, the internal housing surface forming a central cavity containing the overrunning clutch.

3. The device of claim 2, wherein the housing includes:
   first and second housing ends;
   a first bearing positioned proximate the first housing end and a second bearing positioned proximate the second housing end, the first and second bearings positioned within the housing and the housing supported on the starter adapter shaft by the first and second bearings.

4. The device of claim 2, wherein the housing includes a race having an external race surface and an internal race surface, the external race surface engaging the internal housing surface and the internal race surface engaging the overrunning clutch.

5. The device of claim 2, further including at least one liner disk and at least one friction disk, the at least one liner disk and the at least one friction disk operatively positioned between the worm gear and the housing and having a spatial relationship along the length of the starter adapter shaft.

6. The device of claim 5, further including:
   a biasing member operatively engaging the worm gear and the external housing surface;
   wherein the external housing surface of the housing includes a fastening area; and
   a fastening member operatively engaging the fastening area and the biasing member, the fastening member positioned to selectively position the biasing member in relation to the housing and the worm gear, said selective positioning adjusting the spatial relationship of the at least one liner disk to the at least one friction disk.

7. The device of claim 2, wherein the housing includes a first retaining member positioned proximate the first housing end and a second retaining member positioned proximate the second housing end.

8. The device of claim 1, wherein the worm gear assembly is positioned to transfer torque from the engine starter to the starter adapter shaft for further transfer to the engine crank shaft.

9. The device of claim 1, wherein the overrunning clutch is selected from the group consisting of a sprag clutch, a roller clutch, a ratchet clutch, a ramp clutch, a slipper clutch, and a wedge ramp clutch.

10. A device for operatively connecting an engine starter to an engine, the engine having an engine crank shaft, the engine starter having a starter shaft having a starter shaft length and a worm spaced radially from the starter adapter shaft and within the length, the device comprising:

a worm gear assembly, the worm gear assembly operatively attached to the starter adapter shaft and the worm, the worm gear assembly including:
  a housing positioned along the length of the starter adapter shaft and approximately radially aligned with the worm, the housing having an external housing surface and an internal housing surface, the internal housing surface forming a central cavity containing the overrunning clutch;
  a worm gear positioned external of the housing to engage the worm; and
  an overrunning clutch positioned radially between the worm gear and the starter adapter shaft and operatively engaging the starter adapter shaft.

11. The device of claim 10, wherein the worm gear assembly is positioned to transfer torque from the engine starter to the starter adapter shaft for further transfer of the torque to the engine crank shaft.

12. The device of claim 10, wherein the housing includes:
first and second housing ends;
a first bearing positioned proximate the first housing end and a second bearing positioned proximate the second housing end, the first and second bearings positioned within the housing and the housing supported on the starter adapter shaft by the plurality of bearings; and
a first retaining member positioned proximate the first housing end opposite the overrunning clutch from the first bearing and a second retaining member positioned proximate the second housing end opposite the overrunning clutch from the second bearing.

13. The device of claim 10, wherein the housing includes a race having an external race surface and an internal race surface, the external race surface engaging the internal housing surface and the internal race surface engaging the overrunning clutch.

14. The device of claim 10, further including at least one liner disk and at least one friction disk, the at least one liner disk and the at least one friction disk operatively positioned between the worm gear and the housing and having a spatial relationship along the length of the starter adapter shaft.

15. The device of claim 14, further including:
a biasing member operatively engaging the worm gear and the external housing surface;
wherein the external housing surface of the housing includes a fastening area; and
a fastening member operatively engaging the fastening area and the biasing member, the fastening member positioned to selectively position the biasing member in relationship to the housing and the worm gear, said selective positioning adjusting the spatial relationship of the at least one liner disk to the at least one friction disk.

16. The device of claim 10, wherein the overrunning clutch is selected from the group consisting of a sprag clutch, a roller clutch, a ratchet clutch, a ramp clutch, a slipper clutch, and a wedge ramp clutch.

17. A device for operatively connecting an engine starter to an engine, the engine having an engine crank shaft, the engine starter having a starter shaft having a starter shaft length and a worm spaced radially from the starter adapter shaft and within the length, the device comprising:
  a worm gear assembly, the worm gear assembly operatively attached to the starter adapter shaft and the worm, the worm gear assembly including:
    a housing positioned along the length of the starter adapter shaft and approximately radially aligned with the worm, the housing having an external housing surface and an internal housing surface, the internal housing surface forming a central cavity containing the overrunning clutch;
    a worm gear positioned external of the housing to engage the worm;
    an overrunning clutch positioned radially between the worm gear and the starter adapter shaft and operatively engaging the starter adapter shaft; and
    wherein the worm gear assembly is positioned to transfer torque from the engine starter to the starter adapter shaft for further transfer of the torque to the engine crank shaft.

18. The device of claim 17, wherein the housing includes:
first and second housing ends;
a first bearing positioned proximate the first housing end and a second bearing positioned proximate the second housing end, the first and second bearings positioned within the housing and the housing supported on the starter adapter shaft by the plurality of bearings;
a first retaining member positioned proximate the first housing end opposite the overrunning clutch from the first bearing and a second retaining member positioned proximate the second housing end opposite the overrunning clutch from the second bearing; and
a race having an external race surface and an internal race surface, the external race surface engaging the internal housing surface and the internal race surface engaging the overrunning clutch.

19. The device of claim 17, further including a plurality of liner disks and a plurality of friction disks, the plurality of liner disks and the plurality of friction disks operatively position between the worm gear and the housing and having a spatial relationship along the length of the starter adapter shaft.

20. The device of claim 19, further including:
a biasing member operatively engaging the worm gear and the external housing surface;
wherein the external housing surface of the housing includes a fastening area; and
a fastening member operatively engaging the fastening area and the biasing member, the fastening member positioned to selectively position the biasing member in relationship to the housing and the worm gear, said selective positioning adjusting the spatial relationship of the plurality of liner disks and the plurality of friction disks.

21. The device of claim 17, wherein the overrunning clutch is selected from the group consisting of a sprag clutch, a roller clutch, a ratchet clutch, a ramp clutch, a slipper clutch, and a wedge ramp clutch.

* * * * *